(12) United States Patent
Sako

(10) Patent No.: US 11,388,303 B2
(45) Date of Patent: Jul. 12, 2022

(54) PRINTING APPARATUS CAPABLE OF COUNTING THE NUMBER OF TIMES OF PRINTING, METHOD FOR CONTROLLING PRINTING APPARATUS, AND STORAGE MEDIUM

(71) Applicant: CANON KABUSHIKI KAISHA, Tokyo (JP)

(72) Inventor: Ritsuto Sako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/327,492

(22) Filed: May 21, 2021

(65) Prior Publication Data

US 2021/0281700 A1    Sep. 9, 2021

Related U.S. Application Data

(63) Continuation of application No. 16/802,259, filed on Feb. 26, 2020, now Pat. No. 11,159,692, which is a continuation of application No. 15/681,889, filed on Aug. 21, 2017, now Pat. No. 10,609,238, which is a continuation of application No. 15/391,647, filed on Dec. 27, 2016, now Pat. No. 10,122,878, which is a continuation of application No. 14/683,042, filed on Apr. 9, 2015, now Pat. No. 9,563,387.

(30) Foreign Application Priority Data

Apr. 15, 2014    (JP) .............................. JP2014-083594

(51) Int. Cl.
  *H04N 1/00*    (2006.01)
  *G06F 3/12*    (2006.01)

(52) U.S. Cl.
  CPC ....... *H04N 1/00832* (2013.01); *G06F 3/1207* (2013.01); *G06F 3/1229* (2013.01); *G06F 3/1259* (2013.01); *G06F 3/1273* (2013.01); *G06F 3/1285* (2013.01); *G06F 3/1287* (2013.01); *H04N 1/00217* (2013.01); *H04N 2201/0094* (2013.01)

(58) Field of Classification Search
  CPC .................................................. H04N 1/00832
  USPC ....................................................... 358/1.15
  See application file for complete search history.

(56) References Cited

U.S. PATENT DOCUMENTS

2004/0230561 A1* 11/2004 Ochiai .................. H04L 41/024

* cited by examiner

*Primary Examiner* — Jacky X Zheng
(74) *Attorney, Agent, or Firm* — Canon U.S.A., Inc. IP Division

(57) ABSTRACT

If the printing protocol associated with a received print job is not an internet printing protocol, the number of times of printing is counted for each type of printing protocol. If the printing protocol associated with a received print job is an internet printing protocol, the number of times of printing is counted while distinguishing a transmission source application by identifying a transmission source application.

11 Claims, 9 Drawing Sheets

FIG. 2A

```
PRINT SETTING
APPLICATION A SETTING    ~201
APPLICATION B SETTING    ~202
IPP SETTING              ~203
HTTP SETTING             ~204
mDNS SETTING             ~205
```
SETTING SCREEN 200

FIG. 2B

```
APPLICATION A SETTING
ON
OFF

OK        BACK
```
SETTING SCREEN 210

FIG. 2C

```
APPLICATION B SETTING
ON
OFF

OK        BACK
```
SETTING SCREEN 220

FIG. 2D

```
IPP SETTING
ON
OFF

OK        BACK
```
SETTING SCREEN 230

FIG. 2E

```
HTTP SETTING
ON
OFF

OK        BACK
```
SETTING SCREEN 240

FIG. 2F

```
mDNS SETTING
ON
OFF

OK        BACK
```
SETTING SCREEN 250

FIG. 3

| SETTING TO BE CHANGED | CONTENTS OF CHANGE | SETTING TO BE CHANGED IN CONJUNCTION WITH CHANGED SETTING |
|---|---|---|
| APPLICATION A SETTING | OFF→ON | IPP SETTING:OFF→ON<br>HTTP SETTING:OFF→ON<br>mDNS SETTING:OFF→ON | 301
| APPLICATION B SETTING | OFF→ON | IPP SETTING:OFF→ON<br>HTTP SETTING:OFF→ON<br>mDNS SETTING:OFF→ON | 302
| APPLICATION A SETTING | ON→OFF | NONE | 303
| APPLICATION B SETTING | ON→OFF | NONE | 304

FIG. 4

| APPLICATION A SETTING | APPLICATION B SETTING | RESPONSE TO mDNS SEARCH PACKET |
|---|---|---|
| OFF | OFF | NOT RESPOND |
| OFF | ON | RETURN RESPONSE INDICATING THAT APPLICATION B IS SUPPORTED |
| ON | OFF | RETURN RESPONSE INDICATING THAT APPLICATION A IS SUPPORTED |
| ON | ON | RETURN RESPONSE INDICATING THAT BOTH APPLICATION A AND APPLICATION B ARE SUPPORTED |

FIG. 5

| APPLICATION A SETTING | APPLICATION B SETTING | OPERATION RELATED TO IPP PRINTING |
|---|---|---|
| OFF | OFF | • NOT RESPOND TO IPP INQUIRY<br>• NOT EXECUTE PRINTING BASED ON PRINT JOB RECEIVED FROM APPLICATION A<br>• NOT EXECUTE PRINTING BASED ON PRINT JOB RECEIVED FROM APPLICATION B | 501 |
| OFF | ON | • RETURN "PDF" IN RESPONSE TO IPP INQUIRY<br>• NOT EXECUTE PRINTING BASED ON PRINT JOB RECEIVED FROM APPLICATION A<br>• EXECUTE PRINTING BASED ON PRINT JOB RECEIVED FROM APPLICATION B | 502 |
| ON | OFF | • RETURN "pwg-raster" IN RESPONSE TO IPP INQUIRY<br>• EXECUTE PRINTING BASED ON PRINT JOB RECEIVED FROM APPLICATION A<br>• NOT EXECUTE PRINTING BASED ON PRINT JOB RECEIVED FROM APPLICATION B | 503 |
| ON | ON | • RETURN "PDF" AND "pwg-raster" IN RESPONSE TO IPP INQUIRY<br>• EXECUTE PRINTING BASED ON PRINT JOB RECEIVED FROM APPLICATION A<br>• EXECUTE PRINTING BASED ON PRINT JOB RECEIVED FROM APPLICATION B | 504 |

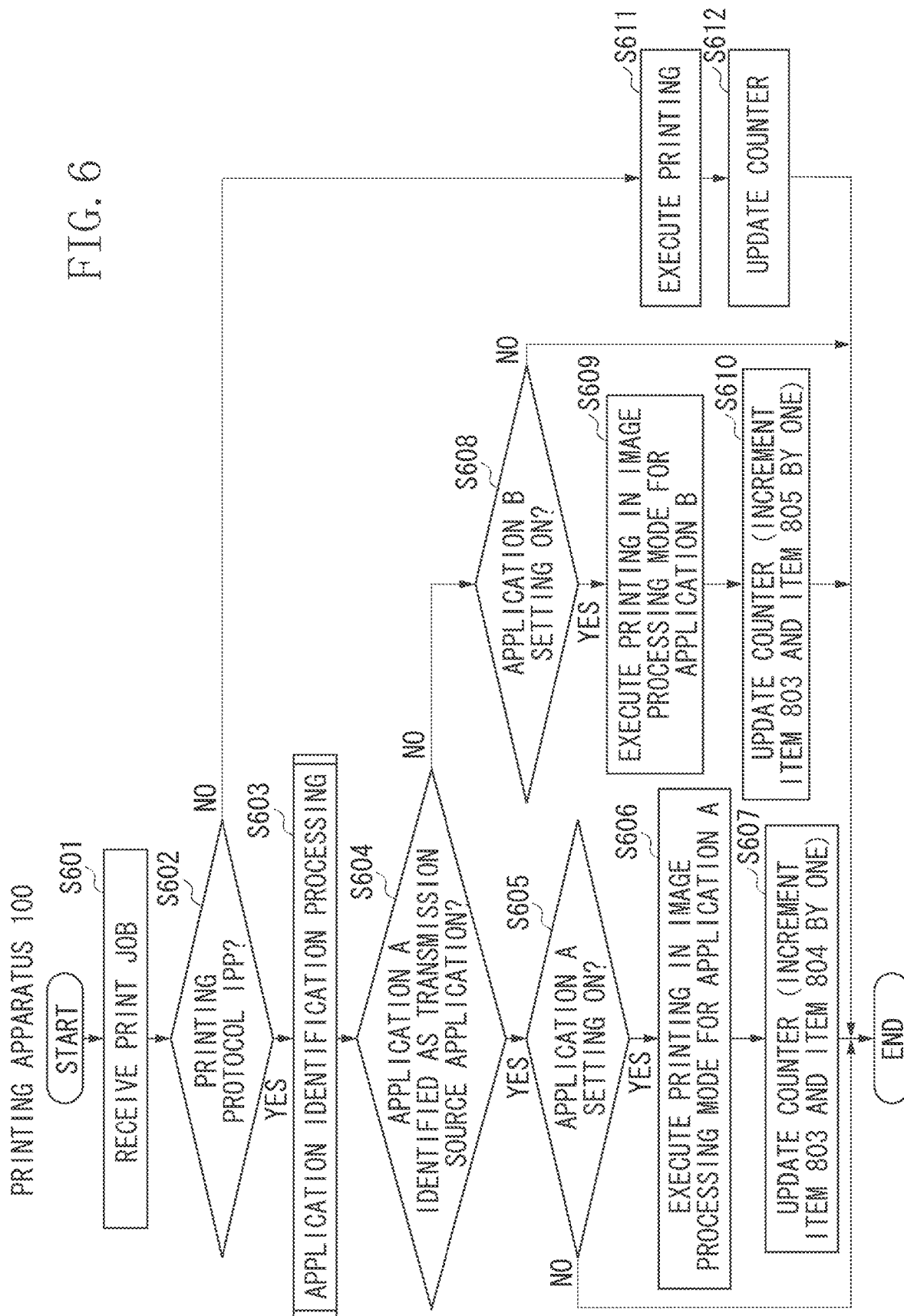

FIG. 8

| CLASSIFICATION | COUNT | |
|---|---|---|
| RAW Print | 200 | ~801 |
| LPR Print | 100 | ~802 |
| IPP Print | 150 | ~803 |
| TRANSMISSION SOURCE IS APPLICATION A | 80 | ~804 |
| TRANSMISSION SOURCE IS APPLICATION B | 70 | ~805 |
| OTHER | 20 | ~806 |

COUNTER 800

PRINTING APPARATUS CAPABLE OF COUNTING THE NUMBER OF TIMES OF PRINTING, METHOD FOR CONTROLLING PRINTING APPARATUS, AND STORAGE MEDIUM

CROSS-REFERENCE TO RELATED APPLICATIONS

This application is a continuation, and claims the benefit U.S. patent application Ser. No. 16/802,259, filed on Feb. 26, 2020, which is a continuation of U.S. patent application Ser. No. 15/681,889, filed on Aug. 21, 2017 and issued as U.S. Pat. No. 10,609,238 on Mar. 31, 2020, which is a continuation of U.S. patent application Ser. No. 15/391,647, filed on Dec. 27, 2016 and issued as U.S. Pat. No. 10,122,878 on Nov. 6, 2018, which is a continuation of U.S. patent application Ser. No. 14/683,042, filed on Apr. 9, 2015 and issued as U.S. Pat. No. 9,563,387 on Feb. 7, 2017, and claims the benefit of, and priority to, Japanese Patent Application No. 2014-083594 filed Apr. 15, 2014, all of which are hereby incorporated by reference herein in their entireties.

BACKGROUND OF THE INVENTION

Field of the Invention

Aspects of the present invention generally relate to a printing apparatus capable of counting the number of times of printing, a method for controlling the printing apparatus, and a storage medium.

Description of the Related Art

A printing apparatus such as a multifunction peripheral and a printer supports various printing protocols. Examples of the printing protocols include an internet printing protocol (IPP), a RAW protocol, and a line printer remote protocol (LPR). Japanese Patent Application Laid-Open No. 2003-80807 discusses a configuration of classifying received print jobs by the types of printing protocols and managing the classified jobs.

The printing apparatus counts the number of times of printing for each type of printing protocol. However, the conventional printing apparatus simply counts the number of times of printing for each type of printing protocol, as described in Japanese Patent Application Laid-Open No. 2003-80807. Even if a plurality of pieces of software such as a first application and a second application transmits print jobs to the printing apparatus, these pieces of software are not distinguished from each other. If a plurality of pieces of software transmits print jobs to the printing apparatus by using the same printing protocol, the print jobs are counted together as printing using the same printing protocol without distinguishing between these pieces of software.

SUMMARY

Aspects of the present invention are generally directed to a technique for counting the number of times of printing while distinguishing a transmission source application, for a specific printing protocol.

According to an aspect of the present invention, a printing apparatus includes a receiving unit configured to receive a print job, a printing unit configured to execute printing based on the received print job, a first identification unit configured to identify a type of a printing protocol of the received print job, a second identification unit configured to identify a transmission source application of the received print job, and a counting unit configured to count a number of times of printing. In a case where the type of the printing protocol is a specific printing protocol, the counting unit counts the number of times of printing while distinguishing a transmission source application according to an identification result of the second identification unit.

Further features of the present disclosure will become apparent from the following description of exemplary embodiments with reference to the attached drawings.

BRIEF DESCRIPTION OF THE DRAWINGS

FIGS. 2A to 2F are diagrams illustrating setting screens.

FIG. 3 is a diagram illustrating other settings to be changed in conjunction with a changed setting.

FIG. 4 is a diagram illustrating a response to a multicast domain name system (mDNS) search packet.

FIG. 5 is a diagram illustrating operations related to printing using Internet Printing Protocol (IPP).

FIG. 6 is a flow chart illustrating processing executed when executing printing.

FIG. 8 is a diagram illustrating a counter.

DESCRIPTION OF THE EMBODIMENTS

Various exemplary embodiments will be described in detail below with reference to the drawings.

Figure 1:
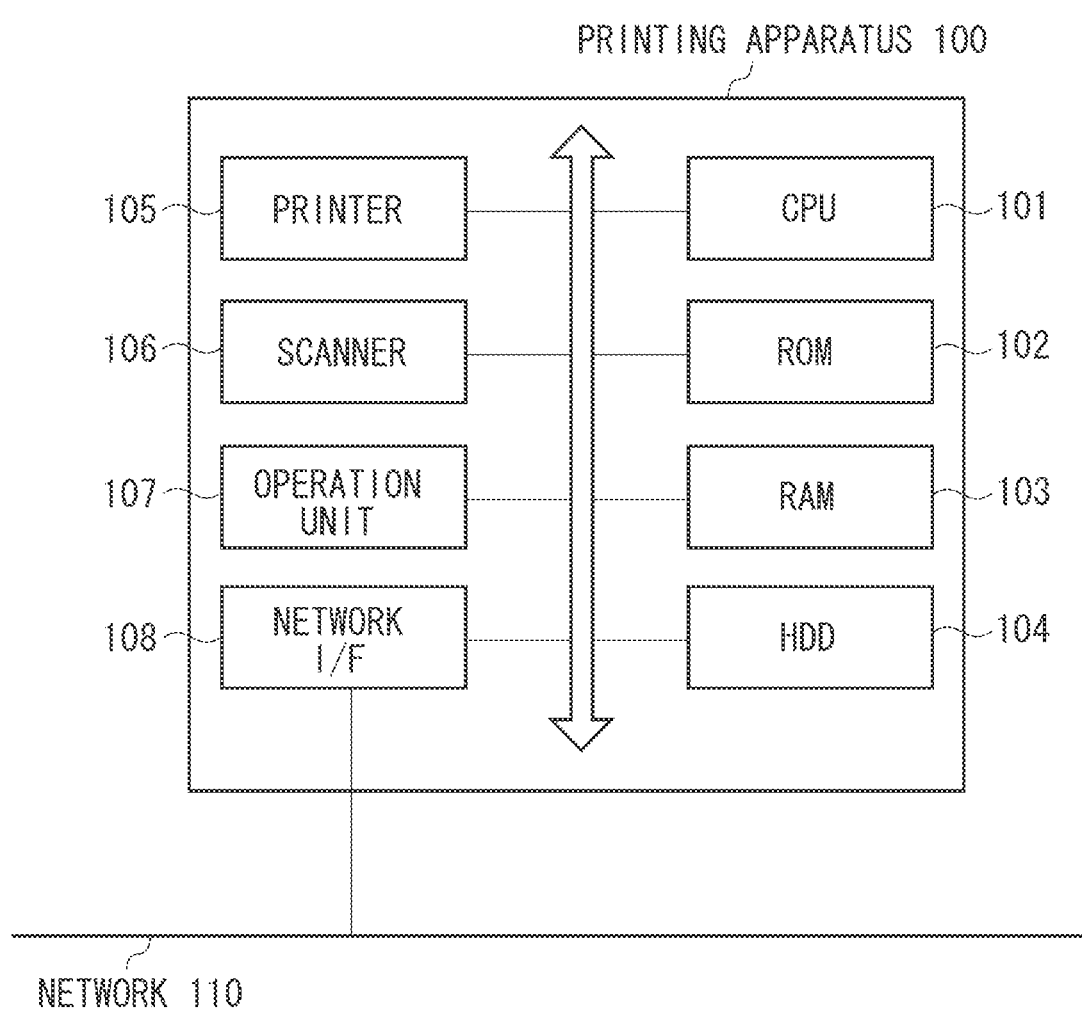
FIG. 1 is a diagram illustrating a configuration of a printing apparatus.

First, a configuration of a printing apparatus 100 according to a first exemplary embodiment will be described with reference to FIG. 1. The printing apparatus 100 according to the present exemplary embodiment is supposed to be a multifunction peripheral. However, the printing apparatus 100 according to the present exemplary embodiment may be a printer that does not include a scanner function.

A central processing unit (CPU) 101 reads a control program stored in a read-only memory (ROM) 102, and executes various types of processing for controlling operations of the printing apparatus 100. The ROM 102 stores the control program. A random access memory (RAM) 103 is used as a main memory of the CPU 101, and a temporary storage area such as a work area. A hard disk drive (HDD) 104 stores various types of data such as a scan image, user setting, and count information to be described below.

In the case of the printing apparatus 100, it is supposed that a single CPU 101 executes respective types of processing illustrated in flow charts to be described below. However, other forms may also be used. For example, the printing apparatus may be configured in such a manner that a plurality of CPUs cooperates with each other to execute the respective types of processing illustrated in the flow charts to be described below.

A printer 105 executes printing on a sheet based on a print job received from an external apparatus or print data such as a scan image generated by a scanner 106. The number of times of printing execution is stored in the HDD 104 as count information to be described below. The scanner 106 reads a document and generates a scan image. The scan image generated by the scanner 106 is printed by the printer 105, or stored in the HDD 104.

An operation unit 107 includes a liquid crystal display unit having a touch panel function and a key board, and displays various screens to be described below. A user can input a command or information to the printing apparatus 100 via the operation unit 107.

A network interface (I/F) 108 is connected to a network 110 to execute communication with an external apparatus. The network I/F 108 may be a wired I/F connected to a local area network (LAN) work cable, or may be a wireless I/F for executing wireless communication, such as Wi-Fi (registered trademark). The network I/F 108 receives a print job transmitted from an external apparatus such as a personal computer (PC) or a portable terminal (for example, smart phone). The printer 105 executes printing based on the received print job.

A print application in the present exemplary embodiment will now be described. In the present exemplary embodiment, two applications, i.e., an application A and an application B are supposed as print applications. These applications are installed in the external apparatus such as the PC or the portable terminal described above.

The application A uses the IPP as a printing protocol, and transmits image data of a pwg-raster format, as a print job. On the other hand, the application B uses the IPP as a printing protocol, and transmits image data of a Portable Document Format (PDF) format, as a print job. In this way, the application A and the application B are different from each other in format of image data handled in the print job. However, the printing protocol in use is the IPP in both applications. The present exemplary embodiment is directed to a technique of counting the number of times of printing execution while distinguishing which application the print job is received from, when the print job is received by using the same printing protocol.

Various types of print setting including settings about the application A and the application B will now be described with reference to FIGS. 2A, 2B, 2C, 2D, 2E, and 2F. A setting screen 200 in FIG. 2A is a screen displayed by the operation unit 107. The setting screen 200 is used for the user performing print setting. In items 201, 202, 203, 204, and 205, "application A setting," "application B setting," "IPP setting," "hypertext transfer protocol (HTTP) setting," and "multicast domain name system (mDNS) setting" are displayed as setting items. If the user selects a predetermined item on the setting screen 200 by, for example, a touch operation, the operation unit 107 displays a screen related to the selected setting item.

A setting screen 210 in FIG. 2B is a screen displayed by the operation unit 107 when the item 201 is selected. The setting screen 210 is used for the user setting whether to permit execution of printing using the application A. If "ON" is set on the setting screen 210, the printing apparatus 100 executes printing using the application A (executes printing based on a print job transmitted from the application A). On the other hand, if "OFF" is set on the setting screen 210, the printing apparatus 100 does not execute printing using the application A (does not execute printing based on a print job transmitted from the application A).

A setting screen 220 in FIG. 2C is a screen displayed by the operation unit 107 when the item 202 is selected. The setting screen 220 is used for the user setting whether to permit execution of printing using the application B. If "ON" is set on the setting screen 220, the printing apparatus 100 executes printing using the application B (executes printing based on a print job transmitted from the application B). On the other hand, if "OFF" is set on the setting screen 220, the printing apparatus 100 does not execute printing using the application B (does not execute printing based on a print job transmitted from the application B).

A setting screen 230 in FIG. 2D is a screen displayed by the operation unit 107 when the item 203 is selected. The setting screen 230 is used for the user setting whether to execute printing using the IPP. If "ON" is set on the setting screen 230, the printing apparatus 100 executes printing using the IPP (printing based on a print job received by the IPP). On the other hand, if "OFF" is set on the setting screen 230, the printing apparatus 100 does not execute printing using the IPP (printing based on a print job received by the IPP).

A setting screen 240 in FIG. 2E is a screen displayed by the operation unit 107 when the item 204 is selected. The setting screen 240 is used for the user setting whether to execute communication based on the HTTP. If "ON" is set on the setting screen 240, the printing apparatus 100 executes communication based on the HTTP. On the other hand, if "OFF" is set on the setting screen 240, the printing apparatus 100 does not execute communication based on the HTTP.

A setting screen 250 in FIG. 2F is a screen displayed by the operation unit 107 when the item 205 is selected. The setting screen 250 is used for the user setting whether to execute communication based on the mDNS. If "ON" is set on the setting screen 250, the printing apparatus 100 executes communication based on the mDNS. On the other hand, if "OFF" is set on the setting screen 250, the printing apparatus 100 does not execute communication based on the mDNS.

The user can perform setting of the printing apparatus 100 by using the setting screens described above with reference to FIGS. 2A to 2F. For example, the user can set whether to permit both printing using the application A and printing using the application B, whether to prohibit either one of them, or whether to prohibit both of them. The printing apparatus 100 may be configured to allow only a specific user (for example, a system administrator) to perform setting using the setting screens illustrated in FIGS. 2A to 2F by introducing an authentication function into the printing apparatus 100.

For executing printing by using the application A or the application B in the present exemplary embodiment, it is necessary to individually set all of the IPP setting, the HTTP setting, and the mDNS setting to "ON." If the user is required to individually set these settings, the user's labor increases. Furthermore, in the first place, there is a possibility that an ordinary user does not recognize necessity of additionally setting these settings to "ON." In the present exemplary embodiment, therefore, all of the IPP setting, the HTTP setting, and the mDNS setting are automatically set to "ON" in conjunction with the application A setting or the application B setting" being set to "ON." Such processing will now be described with reference to FIG. 3.

First, processing indicated in 301 in FIG. 3 will now be described. It is supposed that the user has set the application A setting to "ON" on the setting screen 210. At this time, the printing apparatus 100 automatically changes the IPP setting, the HTTP setting, and the mDNS setting, which are required for executing the printing using the application A, to "ON" as well. As a result, the user's labor of individually changing the settings is removed. Furthermore, the printing apparatus 100 can automatically change settings to appropriate settings even if the user does not properly recognize settings required for printing using the application A.

Processing indicated in 302 in FIG. 3 will now be described. It is supposed that the user has set the application B setting to "ON" on the setting screen 220. At this time, the printing apparatus 100 automatically changes the IPP setting, the HTTP setting, and the mDNS setting, which are required for executing the printing using the application B, to "ON" as well. As a result, the user's labor of individually changing the settings is removed. Furthermore, the printing apparatus 100 can automatically change settings to appropriate settings even if the user does not properly recognize settings required for printing using the application B.

As described above, when the user sets the application A setting or the application B setting to "ON," the printing apparatus 100 can automatically change the IPP setting, the HTTP setting, and the mDNS setting to "ON" as well in conjunction with the application A setting or the application B setting. In the case of the printing apparatus 100, even if the user changes the application A setting or the application B setting to "OFF," the IPP setting, the HTTP setting, and the mDNS setting are not set to "OFF" in conjunction with such setting change (see 303 and 304 in FIG. 3). This is because there is a possibility that the IPP setting, the HTTP setting, and the mDNS setting may be related to setting different from the application A setting or the application B setting.

A relation between the application A setting or the application B setting and operations of the mDNS will now be described with reference to FIG. 4. In the present exemplary embodiment, the mDNS is used for an external apparatus such as the PC or the portable terminal searching for a printing apparatus.

Processing indicated in 401 in FIG. 4 will now be described. In a case where both the application A setting and the application B setting are set to "OFF," even if the printing apparatus 100 receives an mDNS search packet, the printing apparatus does not respond to the received search packet.

Processing indicated in 402 in FIG. 4 will now be described. In a case where the application A setting is set to "OFF" while the application B setting is set to "ON," when the printing apparatus 100 receives an mDNS search packet, the printing apparatus 100 returns a response indicating that the application B is supported. Since the application A setting is set to "OFF," the printing apparatus 100 does not return a response indicating that the application A is supported.

Processing indicated in 403 in FIG. 4 will now be described. In a case where the application A setting is set to "ON" while the application B setting is set to "OFF," when the printing apparatus 100 receives an mDNS search packet, the printing apparatus 100 returns a response indicating that the application A is supported. Since the application B setting is set to "OFF," the printing apparatus 100 does not return a response indicating that the application B is supported.

Processing indicated in 404 in FIG. 4 will now be described. In a case where both the application A setting and the application B setting are set to "ON," when the printing apparatus 100 receives an mDNS search packet, the printing apparatus 100 returns a response indicating that both the application A and the application B are supported.

As described above, the printing apparatus 100 can switch processing to be executed when an mDNS search packet is received, accordance to the application A setting and the application B setting.

Processing to be executed when printing is executed using the IPP will now be described with reference to FIG. 5. An application of the external apparatus inquires of the printing apparatus 100 about an image format that the printing apparatus 100 supports. Upon receiving the inquiry, the printing apparatus 100 responds to the inquiry according to the application A setting and the application B setting.

First, processing indicated in 501 in FIG. 5 will now be described. In a case where both the application A setting and the application B setting are set to "OFF," even if the printing apparatus 100 receives an inquiry about the IPP, the printing apparatus does not respond to the inquiry. Furthermore, even if the printing apparatus 100 receives a print job from either the application A or the application B, the printing apparatus 100 does not execute printing based on the received print job. When the printing apparatus 100 receives a print job by using the IPP, it is necessary to determine which of the application A and the application B the print job is transmitted from. A determination method thereof will be described in detail with reference to flow charts illustrated in FIGS. 6 and 7 to be described below.

Processing indicated in 502 in FIG. 5 will now be described. In a case where the application A setting is set to "OFF" while the application B setting is set to "ON," if the printing apparatus 100 receives an inquiry about the IPP, the printing apparatus 100 returns "PDF" as a supported image format. Furthermore, the printing apparatus 100 does not execute printing based on a print job received from the application A, but executes printing based on a print job received from the application B.

Processing indicated in 503 in FIG. 5 will now be described. In a case where the application A setting is set to "ON" while the application B setting is set to "OFF," if the printing apparatus 100 receives an inquiry about the IPP, the printing apparatus 100 returns "pwg-raster" as the supported image format. Furthermore, the printing apparatus 100 executes printing based on a print job received from the application A, and does not execute printing based on a print job received from the application B.

Processing indicated in 504 in FIG. 5 will now be described. In a case where both the application A setting and the application B setting are set to "ON," if the printing apparatus 100 receives an inquiry about the IPP, the printing apparatus 100 returns "PDF" and "pwg-raster" as a supported image format. Furthermore, whichever of the application A and the application B the printing apparatus 100 receives a print job from, the printing apparatus executes printing based on the received print job.

As described above, the printing apparatus 100 can switch operations related to the printing using the IPP, according to the application A setting and the application B setting.

Processing to be executed when the printing apparatus 100 executes printing will now be described with reference to flow charts illustrated in FIGS. 6 and 7. Each step illustrated in the flow charts in FIGS. 6 and 7 is processed by the CPU 101 loading a control program stored in a memory such as the ROM 102 onto the RAM 103 and executing the loaded program.

In the case of the present exemplary embodiment, the external apparatus such as the PC or the portable terminal transmits a print job to the printing apparatus 100 via the network 110. When transmitting a print job, the external apparatus uses various printing protocols such as the IPP, the RAW protocol, and the LPR protocol. First, in step S601, the network I/F 108 receives a print job transmitted from the external apparatus. Then, in step S602, the CPU 101 determines whether the printing protocol of the received print job is the IPP. Determination of the printing protocol is performed based on, for example, a reception port number. If the CPU 101 determines in step S602 that the printing protocol of the received print job is the IPP (YES in step S602), the processing proceeds to step S603. On the other hand, if the CPU 101 determines in step S602 that the printing protocol of the received print job is not the IPP (NO in step S602), the processing proceeds to step S611.

Step S603 will now be described. In step S603, the CPU 101 executes application identification processing to identify an application that is a transmission source of the print job received by using the IPP. The application identification processing will now be described in detail with reference to the flow chart in FIG. 7.

Figure 7:
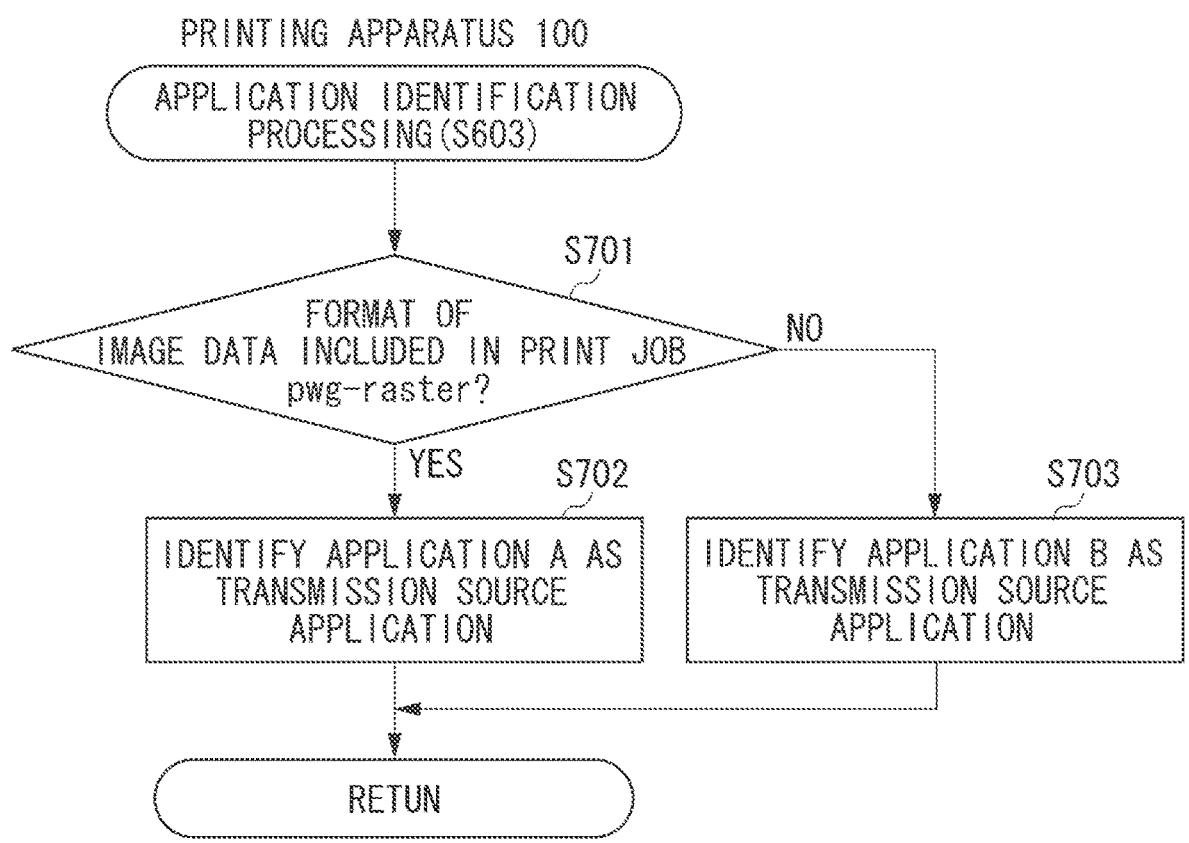
FIG. 7 is a flow chart illustrating application identification processing.

FIG. 7 is a sub-flow chart for describing the application identification processing in step S603 in FIG. 6. In step S701, the CPU 101 analyzes the received print job, and determines whether a format of image data included in the print job is pwg-raster. Determination of the format of the image data is performed by, for example, analyzing header information of the image data. If the format of the image data included in the print job is determined to be pwg-raster (YES in step S701), the processing proceeds to step S702. In step S702, the CPU 101 identifies the application A as a transmission source application.

On the other hand, when the format of the image data included in the print job is, for example, PDF, the CPU 101 determines in step S701 that the format of the image data included in the print job is not pwg-raster (NO in step S701), and the processing proceeds to step S703. In step S703, the CPU 101 identifies the application B as a transmission source application.

As described above, by executing the application identification processing described with reference to the flow chart in FIG. 7, the printing apparatus 100 can identify the transmission source application of the print job received using the IPP. If the transmission source application of the print job received using the IPP is identified, the processing returns to FIG. 6 and proceeds to step S604.

Step S604 will now be described. In step S604, the CPU 101 determines whether the transmission source application is the application A, according to a result of the application identification processing executed in step S603. If the CPU 101 determines in step S604 that the transmission source application is the application A (YES in step S604), the processing proceeds to step S605. On the other hand, if the CPU 101 determines in step S604 that the transmission source application is not the application A, i.e., the transmission source application is the application B (NO in step S604), the processing proceeds to step S608.

Step S605 will now be described. In step S605, the CPU 101 determines whether the application A setting is ON. When the application A setting is set to ON, the CPU 101 determines in step S605 that the application A setting is ON (YES in step S605), and the processing proceeds to step S606. On the other hand, when the application A setting is set to OFF, the CPU 101 determines in step S605 that the application A setting is not ON (NO in step S605), and the processing illustrated in the flow chart ends without executing printing based on the received print job.

Step S606 will now be described. In step S606, the printer 105 executes printing based on the received print job. Furthermore, when executing printing in step S606, the printer 105 executes printing in an image processing mode for the application A. The image processing mode for the application A is preset depending on use of the application A. For example, in a case where the application A is often used in printing of a picture image such as a photograph, an image processing mode of prioritizing the image quality of pictures is preset as an image processing mode for the application A.

If printing is executed in step S606, the processing proceeds to step S607. In step S607, the CPU 101 updates a counter 800 for counting the number of times of printing. This counter will now be described in detail with reference to FIG. 8.

The counter 800 illustrated in FIG. 8 is a counter for counting the number of times of printing execution for each printing protocol. The counter 800 is stored in the HDD 104. In the present exemplary embodiment, the counting is performed while classifying printing protocols into four types, i.e., "RAW Print" using the RAW protocol (item 801), "LPR Print" using the LPR protocol (item 802), "IPP Print" using the IPP (item 803), and "Other" indicating other printing protocols (item 806). Furthermore, the present exemplary embodiment is characterized in that the counting is performed while further distinguishing, for the IPP Print, whether the transmission source application is the application A or the application B (items 804 and 805).

In a case where the processing in step S607 is executed, the received print job uses the IPP and the transmission source application is the application A. In step S607, therefore, values of the items 803 and 804 are respectively incremented by one.

Step S608 will now be described. In step S608, the CPU 101 determines whether the application B setting is ON. When the application B setting is set to ON, the CPU 101 determines in step S608 that the application B setting is ON (YES in step S608), and the processing proceeds to step S609. On the other hand, when the application B setting is set to OFF, the CPU 101 determines in step S608 that the application B setting is not ON (NO in step S608), and the processing illustrated in the flow chart ends without executing printing based on the received print job.

Step S609 will now be described. In step S609, the printer 105 executes printing based on the received print job. Furthermore, when executing printing in step S609, printing is executed in an image processing mode for the application B. The image processing mode for the application B is preset depending on use of the application B. For example, in a case where the application B is often used in printing of a business document such as a Word document, an image processing mode of prioritizing the image quality of characters is preset as an image processing mode for the application B.

If printing is executed in step S609, the processing proceeds to step S610. In step S610, the CPU 101 updates the counter 800. In step S610, values of the items 803 and 805 are respectively incremented by one.

Step S611 will now be described. In step S611, the printer 105 executes printing based on the received print job. At this time, the printing protocol of the print job is not the IPP. If the printing is executed, in step S612, the CPU 101 updates the counter 800. In step S612, a value of an item corresponding to the printing protocol of the print job is incremented by one. For example, if the printing protocol is the RAW protocol, a value of the item 801 is incremented by one. If the printing protocol is the LPR protocol, a value of the item 802 is incremented by one.

As described above, according to the present exemplary embodiment, it is possible to count the number of times of printing for each type of printing protocol, and as for the IPP, count the number of times of printing while distinguishing a transmission source application.

Furthermore, the IPP is expected to be utilized in various printing services with the development of cloud service and spread of touch printing using near field communication (NFC). Therefore, as for the IPP, by counting the number of times of printing while distinguishing a transmission source application, a system administrator and a manufacturer of the printing apparatus 100 can grasp how the printing apparatus 100 is used.

In the first exemplary embodiment, a transmission source application is distinguished based on the format of the image data included in the print job, as described with reference to FIG. 7. However, a method for distinguishing the transmission source application is not limited to the method described in the first exemplary embodiment. A method different from the method described in the first exemplary embodiment will now be described as a second exemplary embodiment.

Figure 9:
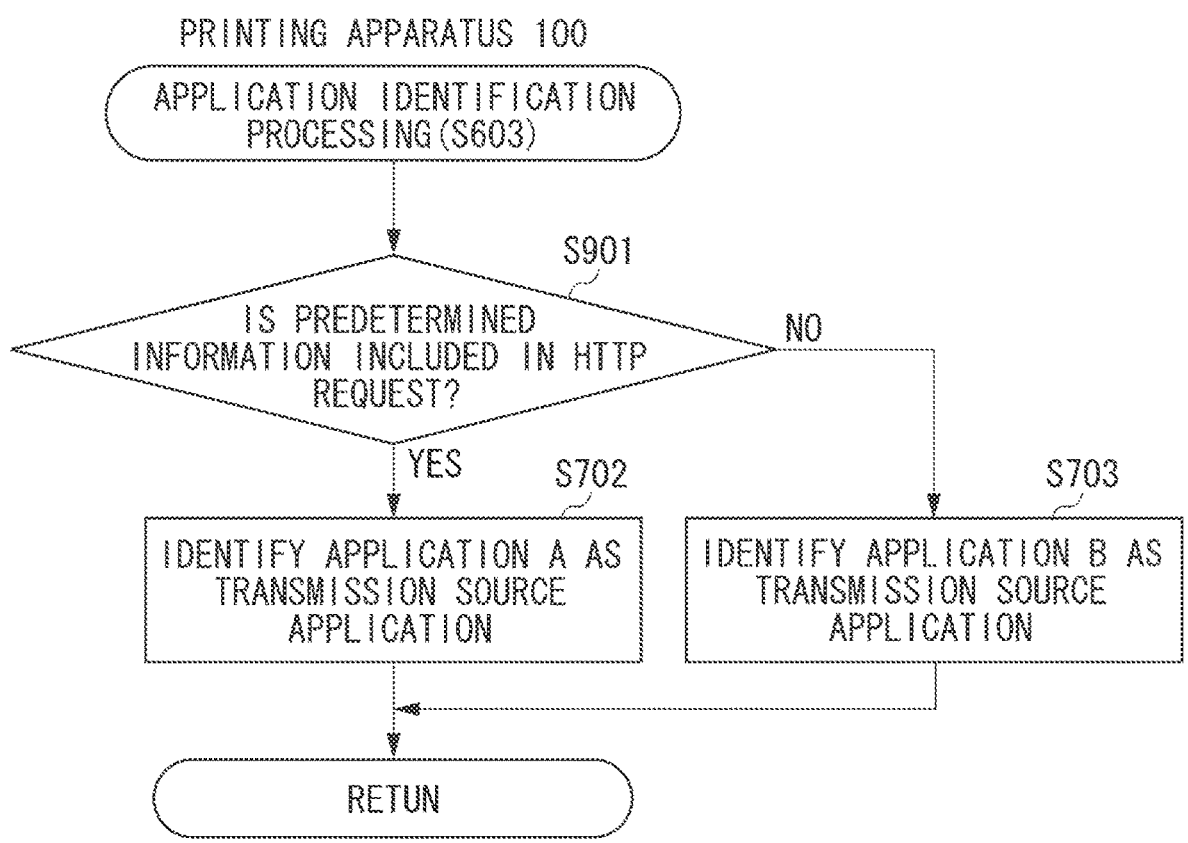
FIG. 9 is a flow chart illustrating a modified example of application identification processing.

FIG. 9 is a sub-flow chart for describing the application identification processing in step S603 in FIG. 6, and is a modified example of the processing described with reference to FIG. 7. Each step illustrated in the flow chart in FIG. 9 is processed by the CPU 101 loading a control program stored in a memory such as the ROM 102 onto the RAM 103 and executing the loaded program.

When the external apparatus such as the PC or the portable terminal transmits a print job to the printing apparatus 100 by using the IPP, the external apparatus first transmits an HTTP request to the printing apparatus 100. In the present exemplary embodiment, the transmission source application is identified based on the HTTP request.

In step S901, the CPU 101 analyzes the received HTTP request, and determines whether predetermined information is included in the received HTTP request. For example, in a case where "application A" indicating the application A is included in UserAgent in an HTTP header, the CPU 101 determines in step S901 that predetermined information is included in the received HTTP request (YES in step S901), and the processing proceeds to step S702. On the other hand, when "application A" is not included in UserAgent in the HTTP header, the CPU 101 determines in step S901 that predetermined information is not included in the received HTTP request (NO in step S901), and the processing proceeds to step S703.

As described above, according to the present exemplary embodiment, it is possible to distinguish the transmission source application based on the HTTP request for printing using the IPP.

In the present exemplary embodiment, the description has been given of a configuration of distinguishing the transmission source application based on the description in UserAgent in the HTTP request. However, the transmission source application may be distinguished by using information other than UserAgent. For example, in a case where attribute information indicating the application A is included in the HTTP request, it may be determined in step S901 that predetermined information is included in the received HTTP request.

In each of the exemplary embodiments described above, the description has been given of the configuration of identifying a transmission source application in a case where the printing protocol of the received print job is the IPP. However, other forms may be used. The transmission source application may be identified in the case of a specific printing protocol different from the IPP, for example, in the case of the LPR protocol.

Furthermore, in each of the exemplary embodiments described above, processing for identifying the transmission source application has been described (FIGS. 7 and 9). However, the object to be identified is not limited to the application. For example, a printing apparatus may be configured to identify transmission source software, such as a type of an operating system (OS) or a printing function mounted on the OS.

According to an exemplary embodiment, it is possible to count the number of times of printing while distinguishing a transmission source application for a specific printing protocol.

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

What is claimed is:

1. A method executed by an apparatus that has a first printing function that executes printing based on data transmitted from a first application using IPP (Internet Printing Protocol) and a second printing function that executes printing based on data transmitted from a second application using the IPP, the method comprising:

making a display unit display a setting screen that includes a first setting, a second setting and a third setting, wherein an ON/OFF state of the first setting is used to enable/disable the first printing function of the apparatus, and wherein an ON/OFF state of the second setting is used to enable/disable the second printing function of the apparatus, and wherein an ON/OFF state of the third setting is used to enable/disable a printing function using the IPP of the apparatus; and applying the ON/OFF state of the first setting, the ON/OFF state of the second setting and the ON/OFF state of the third setting, which are selected on the setting screen, to the apparatus, wherein, if a state of the third setting displayed on the setting screen is the OFF state when a user changes a state of the first setting displayed on the setting screen from the OFF state to the ON state, the state of the third setting displayed on the setting screen is automatically changed from the OFF state to the ON state, and wherein, if a state of the third setting displayed on the setting screen is the OFF state when the user changes a state of the second setting displayed on the setting screen from the OFF state to the ON state, the state of the third setting displayed on the setting screen is automatically changed from the OFF state to the ON state.

2. The method according to claim 1,
wherein a state of the third setting displayed on the setting screen is not automatically changed from the ON state to the OFF state even if the user changes a state of the first setting displayed on the setting screen from the ON state to the OFF, and
wherein a state of the third setting displayed on the setting screen is not automatically changed from the ON state to the OFF state even if the user changes a state of the second setting from the ON state to the OFF state.

3. The method according to claim 1,
wherein the first application uses both of the IPP and an mDNS (MulticastDNS), and wherein the second application uses both of the IPP and the mDNS,
wherein the setting screen includes the first setting, the second setting, the third setting and a fourth setting,
wherein an ON/OFF state of the fourth setting is used to enable/disable a communication relating to the mDNS of the apparatus,
wherein, if a state of the fourth setting displayed on the setting screen is the OFF state when the user changes a state of the first setting displayed on the setting screen from the OFF state to the ON state, the state of the fourth setting displayed on the setting screen is automatically changed from the OFF state to the ON state, and
wherein, if a state of the fourth setting displayed on the setting screen is the OFF state when the user changes a state of the second setting displayed on the setting screen from OFF state to ON state, the state of the fourth setting displayed on the setting screen is automatically changed from the OFF state to the ON state.

4. The method according to claim 3,
wherein the state of the fourth setting displayed on the setting screen is not automatically changed from the ON state to the OFF state even if the user changes the state of the first setting displayed on the setting screen from the ON state to the OFF state, and
wherein the state of the fourth setting displayed on the setting screen is not automatically changed from the ON state to the OFF state even if the user changes the state of the second setting from the ON state to the OFF state.

5. The method according to claim 1, further comprising:
executing the first printing function in response to receiving data transmitted from the first application using the IPP both of the first printing function of the apparatus and the printing function using the IPP of the apparatus are enabled; and
executing the second printing function in response to receiving data transmitted from the second application using the IPP when both of the second printing function of the apparatus and the printing function using the IPP of the apparatus are enabled.

6. The method according to claim 1,
wherein the first application is a first program installed in an external apparatus, and wherein the second application is a second program installed in the external apparatus.

7. The method according to claim 6,
wherein the external apparatus is a PC or a portable terminal.

8. The method according to claim 1,
wherein the setting screen comprises one or more screen.

9. The method according to claim 1,
wherein the apparatus has the display unit.

10. A printing apparatus that has a first printing function that executes printing based on data transmitted from a first application using IPP (Internet Printing Protocol) and a second printing function that executes a printing based on data transmitted from a second application using the IPP, the printing apparatus comprising:
at least one memory that stores a set of instructions; and
at least one processor that executes the set of instructions to:
control a display unit to display a setting screen that includes a first setting, a second setting and a third setting, wherein an ON/OFF state of the first setting is used to enable/disable the first printing function of the printing apparatus, and wherein an ON/OFF state of the second setting is used to enable/disable the second printing function of the printing apparatus, and wherein an ON/OFF state of the third setting is used to enable/disable a printing function using the IPP of the printing apparatus; and
apply the ON/OFF state of the first setting, the ON/OFF state of the second setting and the ON/OFF state of the third setting, which are selected on the setting screen, to the printing apparatus,
wherein, if a state of the third setting displayed on the setting screen is the OFF state when a user changes a state of the first setting displayed on the setting screen from the OFF state to the ON state, the state of the third setting displayed on the setting screen is automatically changed from the OFF state to the ON state, and
wherein, if a state of the third setting displayed on the setting screen is the OFF state when the user changes a state of the second setting displayed on the setting screen from the OFF state to the ON state, the state of the third setting displayed on the setting screen is automatically changed from the OFF state to the ON state.

11. A non-transitory computer-readable storage medium storing computer executable instructions for causing a computer to execute a method for controlling a printing apparatus that has a first printing function that executes printing based on data transmitted from a first application using IPP (Internet Printing Protocol) and a second printing function that executes a printing based on data transmitted from a second application using the IPP, the method comprising:
making a display unit display a setting screen that includes a first setting, a second setting and a third setting, wherein an ON/OFF state of the first setting is used to enable/disable the first printing function of the printing apparatus, and wherein an ON/OFF state of the second setting is used to enable/disable the second printing function of the printing apparatus, and wherein an ON/OFF state of the third setting is used to enable/disable a printing function using the IPP of the printing apparatus; and
applying the ON/OFF state of the first setting, the ON/OFF state of the second setting and the ON/OFF state of the third setting, which are selected on the setting screen, to the printing apparatus, wherein, if a state of the third setting displayed on the setting screen is the OFF state when a user changes a state of the first setting displayed on the setting screen from the OFF state to the ON state, the state of the third setting displayed on the setting screen is automatically changed from the OFF state to the ON state, and wherein, if a state of the third setting displayed on the setting screen is the OFF state when the user changes a state of the second setting displayed on the setting screen from the OFF state to the ON state, the state of the third setting displayed on the setting screen is automatically changed from the OFF state to the ON state.

* * * * *